Patented Mar. 16, 1954

2,672,462

UNITED STATES PATENT OFFICE 2,672,462

ANTHRIMIDE CARBAZOLE

Maurice Grélat, Basel, and Walter Kern, Sissach, Switzerland, assignors to Ciba Limited, Basel, Switzerland, a Swiss firm No Drawing. Application June 11, 1951, Serial No. 231,064

Claims priority, application Switzerland June 23, 1950

1 Claim. (Cl. 260—316)

According to this invention valuable vat dyestuffs are made by treating a linear polyanthrimide containing at least five anthraquinone nuclei with a carbazolizing agent.

As linear polyanthrimides there are to be used as starting materials for the present invention anthrimides built up of a plurality of anthraquinone nuclei, in which as normally represented in structural formulae all the anthrimide bonds lie in a straight line. This is the case when each of the anthrimide bonds occupy the 1:4-position (para-position) relatively to one another, so that the 4-position of every anthraquinone nucleus is linked through an —NH— group to the 1-position of the next anthraquinone nucleus.

It is especially advantageous to use polyanthrimides which are free from acylamino groups and, if desired, are entirely free from further substituents. Favourable results are obtained more especially with linear polyanthrimides containing 5-6 anthraquinone nuclei.

The polyanthrimides serving as starting materials for the present invention, which contain at least five and if desired a larger number, for example, up to 8, anthraquinone nuclei, can be prepared by the reaction of $\alpha$-aminoanthraquinone compounds with $\alpha$-halogen-, preferably $\alpha$-chloranthraquinone compounds. One method of preparing the polyanthrimides consists, for example, in condensing together in equimolecular proportions two compounds of the type

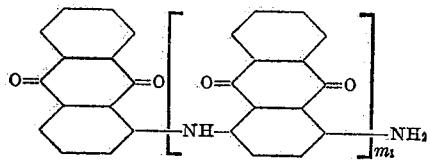

and

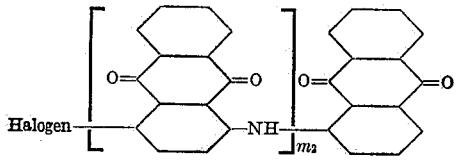

in which $m_1$ and $m_2$ represent whole numbers, the sum of which amounts to at least 3. Another method consists in condensing together in the molecular ratio 1:2 two compounds of the type

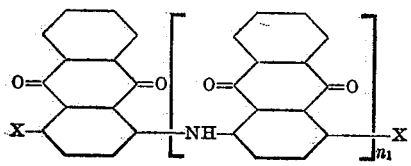

and

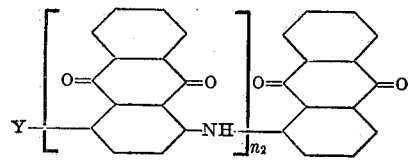

in which one of the symbols X and Y represents an —NH$_2$ group and the other a halogen atom, and $n_1$ and $n_2$ are whole numbers so chosen that $n_1+2n_2$ amounts to at least 2. By the first mentioned method, for example, 1:1'-4':1''-4'':1'''-4''':1'''':4'''':1'''''-hexanthrimide can be made from 4-chloro-1:1'-4':1''-trianthrimide and 4-amino-1:1'-4':1''-trianthrimide, and by the second mentioned method 1:1'-4':1''-4'':1'''-4''':1''''-pentanthrimide can be made from 1 mol of 1:4-dichloranthraquinone and 2 mols of 4-amino-1:1'-dianthrimide.

The condensation to form the polyanthrimides may be conducted by the usual known methods. In cases in which the ordinary solvents such as nitrobenzene have too low a solvent power, which may occur especially with starting materials already containing several anthraquinone nuclei in the molecule, higher hydrocarbons such, for example, as anthracene or phenanthrene may be used as solvents.

As carbazoling agents there may be used in the present process, more especially, the various known combinations of aluminium chloride with fluxing agents. How far these fluxing agents form molecular compounds with aluminium chloride may be uncertain in particular cases. As such fluxing agents there may be mentioned aromatic compounds such as nitrobenzene, inorganic compounds such as sulfur dioxide, if desired alone or in conjunction with one another. Advantageous results are generally obtained by the use of aluminium chloride with the addition of a tertiary base, for example, a tertiary base free from hydroxyl groups such, for example, as triethylamine. Especially suitable, however, are cyclic bases such, for example, as quinoline and acridine, and above all pyridine bases themselves or their nearest homologues, for example, methyl pyridines, such as $\alpha$-picoline or mixtures of pyridine bases such as the commercial $\beta$- and $\gamma$-picoline mixture.

The carbazolization of the polyanthrimides may be carried out with advantage at temperatures ranging from about 120–180° C. When pyridine and aluminium chloride are used temperatures of about 140° C. are especially advantageous, while the picolines, for example, enable the reaction to be carried out at higher temperatures (up to about 180° C.). Depending on the choice of the condensing agent and the reaction temperature the properties of the products will exhibit certain differences, for example, with respect to the tint of the vat dyeing produced therewith.

The reaction mixture may be worked up in the usual manner, for example, by rendering the reaction mixture alkaline with an alkali hydroxide after diluting it with water, and by the addition of a suitable reducing agent, such as sodium hydrosulfite, to vat the resulting dyestuff, and then precipitating it by oxidation, for example, with air.

In the present process at least one half of the theoretically possible amount of carbazole ring closure takes place, and the above mentioned differences in the properties of the end products are no doubt largely due to the fact that the carbazolization proceeds more or less nearly to completion depending on the reaction conditions. Accordingly, the vat dyestuffs obtainable by the present process correspond to the general formula

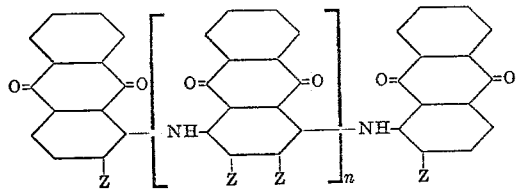

in which $n$ represents a whole number greater than 2, and advantageously 3 or 4, and at least one-half of the radicals

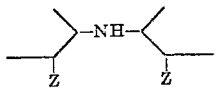

stand for atomic groupings of the formula

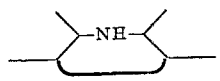

and the remainder of these radicals stand for atomic groupings of the formula

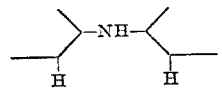

The new dyestuffs can be used as pigments. However, they are especially suitable for dyeing and printing a very wide variety of fibers especially cellulose fibers such as cotton, linen and artificial silk and staple fibers of regenerated cellulose. They can also be used in the form of their leuco-ester salts obtainable by known methods, for example, their sulfuric acid leuco-ester salts, for dyeing and printing by methods known for this class of dyestuffs. There are principally obtained grey to grey-brown dyeings which are valuable both in view of their tints and of their properties of fastness.

The following examples illustrate the invention, the parts and percentages being by weight unless otherwise stated and the relationship of parts by weight to parts by volume being the same as that of the kilogram to the liter:

*Example 1*

25 parts of aluminium chloride are introduced, while stirring at 10–60° C. into 60 parts of anhydrous pyridine. The whole is heated to 100° C. and at that temperature 5 parts of 1:1′-4′:1″-4″:1‴-4‴:1⁗-pentanthrimide are added. In the course of 45 minutes the temperature is raised to 139–141° C. with the simultaneous distillation of pyridine. The whole is stirred for 1 hour at 140° C., and the reaction mixture is poured into 1000 parts of cold water. To the resulting suspension 120 parts of caustic soda solution of 30 per cent. strength are added, and the whole is heated while stirring to 50° C. 5 parts of sodium hydrosulfite of 85 per cent. strength are then added, and the whole is stirred for 15 minutes at 60° C. and filtered to remove a small amount of residual matter. Air is blown through the filtrate, the precipitated dyestuff is separated by filtering with suction, washed and dried. It is a dark powder which dissolves in concentrated sulfuric acid with a brown-black coloration and dyes cotton from a brown vat fast grey tints.

The 1:1′-4′:1″-4″:1‴-4‴:1⁗-pentanthrimide used in this example may be prepared as follows:

3.28 parts of 1:4-dichloranthraquinone, 26.64 parts of 4-amino-1:1′-dianthrimide, 6.5 parts of sodium carbonate, 1.6 parts of cuprous chloride and 250 parts of nitrobenzene are heated while stirring to 160° C., and then maintained for 3 hours at 160–170° C. and for 8 hours at 200–205° C. After cooling the mixture to 70° C., it is filtered with suction, and the filter residue is washed with nitrobenzene and then with alcohol. The pentanthrimide is then extracted at the boil with hydrochloric acid of 2 per cent. strength, the mixture is filtered with suction, and the filter residue is washed neutral and dried. It is a dark violet powder which dissolves in concentrated sulfuric acid with a dark green coloration.

*Example 2*

25 parts of aluminium chloride are introduced at 10–60° C. into 60 parts of dry pyridine while stirring. The whole is heated to 100° C. and at that temperature 5 parts of 1:1′-4′:1″-4″:1‴-4‴:1⁗-4⁗:1⁗′-hexanthrimide are added. In the course of 45 minutes the temperature is raised to 139–141° C. with the simultaneous distillation of pyridine. The whole is then stirred for 1 hour at 140° C. and the reaction mixture is poured into 1000 parts of cold water. To the suspension are added 120 parts of caustic soda solution of 30 per cent. strength, and the whole is heated while stirring to 50° C. 5 parts of sodium hydrosulfite of 85 percent. strength are added, and the mixture is stirred for 15 minutes at 60° C. and then filtered to remove a small amount of residual matter. Air is blown through the filtrate and the precipitated dyestuff is separated by filtering with suction, washed and dried. It is a dark powder which dissolves in concentrated sulfuric acid with a brown-black coloration and dyes cotton from a brown vat fast grey brown tints.

The 1:1′ - 4′:1″ - 4″:1‴ - 4‴:1⁗ - 4⁗:1⁗′ - hexanthrimide used in this example may be prepared as follows:

6.9 parts of 4′-chloro-1′:1″-1:4-trianthrimide, 6.7 parts of 4′-amino-1′:1″-1:4-trianthrimide, 2 parts of sodium carbonate, 1 part of copper acetate and 350 parts of nitrobenzene are ground to a very fine paste, and then heated for 24 hours at 200–205° C. while stirring. At a temperature of 70° C. the whole is filtered with suction, the filtered residue is washed with warm nitrobenzene and then with alcohol. The crude product is extracted at the boil with hydrochloric acid of 2 per cent. strength, separated by filtering with suction, washed until neutral and dried. The hexanthrimide is a dark powder which dissolves in concentrated sulfuric acid with a dark green coloration.

4'-amino-1':1''-1:4-trianthrimide and 4'-chloro-1':1''-1:4-trianthrimide are prepared as follows:

7.1 parts of 4-chloro-1:1'-dianthrimide, 4 parts of 1-amino-4-nitroanthraquinone, 2 parts of sodium carbonate, 0.3 part of cuprous chloride and 100 parts of nitrobenzene are heated in the course of 2 hours at 200° C., and stirred at this temperature for 6 hours. The whole is filtered with suction at 50° C., and the filter residue is washed with nitrobenzene and then with alcohol. The 4'-nitro-1':1''-1:4-trianthrimide, which is a dark brown powder, is reduced in alcoholic suspension by means of an aqueous solution of sodium sulfide at 85–90° C. The 4'-amino-1':1''-1:4-trianthrimide is a dark blue powder.

3.9 parts of 4-amino-1':1''-1:4-trianthrimide are dissolved in 100 parts of concentrated sulfuric acid. 1.5 parts of sodium nitrite are added, the whole is stirred for 4 hours at 20–25° C. and the mixture is poured on to 500 parts of ice, filtered with suction, and the filter residue is washed with 500 parts of water. The diazonium salt is pasted with 100 parts of hydrochloric acid of 10 per cent. strength, added to a solution of 2 parts of cuprous chloride in 100 parts of concentrated hydrochloric acid, stirred for 3 hours at ordinary temperature, filtered with suction, and the filter residue is washed until neutral and dried. The chloro-trianthrimide is a dark violet powder.

*Example 3*

50 parts of aluminium chloride are introduced at 20–80° C. while stirring into 125 parts of α-picoline. The whole is heated to 100–110° C., and then 10 parts of 1:1'-4':1''-4'':1'''-4''':1''''-pentanthrimide are added. The temperature is raised to 140° C. in the course of 40 minutes with the simultaneous distillation of the excess of α-picoline. The whole is stirred for 1 hour at 140° C., and the reaction mixture is poured into 2000 parts of ice. To the resulting suspension are added 300 parts of sodium hydroxide solution of 30 per cent. strength, the mixture is stirred for a short time, filtered with suction, and the filter residue is washed until neutral and dried. The dyestuff is a dark powder which has properties similar to those of the dyestuff of Example 1.

*Example 4*

50 parts of aluminium chloride are introduced at 20–80° C. while stirring, into 80 parts of a commercial mixture of β- and γ-picoline containing a small amount of dimethylpyridine. The whole is heated to 100° C. and then 10 parts of 1:1'-4':1''-4'':1'''-4''':1'''' - pentanthrimide are then added. The temperature is raised to 140° C. in the course of 45 minutes. It is stirred for one hour at 140° C. and the reaction mixture is poured into 2000 parts of ice. 300 parts of sodium hydroxide solution of 30 per cent. strength are added, and the dyestuff is separated by filtering with suction, washed until neutral and dried. It is a dark powder which dyes cotton from a brown vat fast grey tints.

*Example 5*

25 parts of aluminium chloride are introduced at 20–80° C. while stirring into 125 parts of α-picoline. The whole is heated to 100° C. and then 10 parts of 1:1'-4':1''-4'':1'''-4''':1''''-4'''':1'''''-hexanthrimide are added. The temperature is raised in the course of 45 minutes to 140° C. with the simultaneous distillation of the excess of α-picoline. The whole is stirred for 1 hour at 140° C. and the reaction mixture is poured into 2000 parts of ice. To the resulting suspension 300 parts of sodium hydroxide solution of 30 per cent. strength are added, the whole is stirred for a short time, filtered with suction, and the filter residue is washed until neutral and dried. The dyestuff is a dark powder which has properties similar to those of the dyestuff of Example 2.

*Example 6*

60 parts of aluminium chloride are introduced at 20–80° C. while stirring into 80 parts of a commercial mixture of β- and γ-picoline containing a small amount of dimethyl pyridine. The whole is heated to 100° C., and then 10 parts of 1:1'-4':1''-4'':1'''-4''':1''''-4'''':1''''' - hexanthrimide are added. The temperature is raised to 140° C. in the course of 45 minutes. The whole is stirred for 1 hour at 140° C. and the reaction mixture is poured into 2000 parts of ice. 300 parts of sodium hydroxide solution of 30 per cent. strength are added, and the dyestuff is separated by filtering with suction, washed until neutral and dried. It is a dark powder which dyes cotton from a brown vat somewhat blacker tints than those of the dyestuff of Example 2.

*Example 7*

1.5 parts of the dyestuff obtainable as described in the first paragraph of Example 1 are vatted in 150 parts of water with the addition of 3 parts of sodium hydrosulfite and 6 parts by volume of caustic soda solution of 36° Bé. at about 50° C. The resulting stock vat is added to a dyebath consisting of 2000 parts of water containing 4 parts by volume of caustic soda solution of 360 Bé. and 2 parts of sodium hydrosulfite. 100 parts of cotton yarn are entered into the dyebath at 40° C., after a ¼ hour 20 parts of sodium chloride are added, and dyeing is carried on for 1 hour while slowly raising the temperature of the dyebath to 50° C. The cotton is then squeezed, oxidized, rinsed in cold water, acidified, again rinsed and finally soaped at the boil for ½ hour. The cotton is dyed a fast grey tint.

What we claim is:

An anthrimide carbazole of the formula

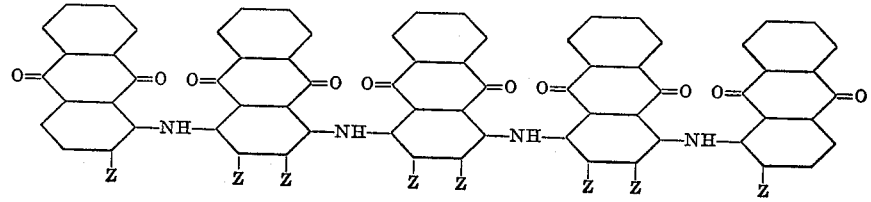

in which at least one half of the radicals
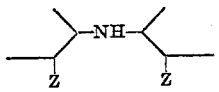
stand for atomic groupings of the formula
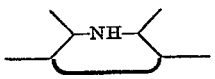
and the remainder of those radicals stand for atomic groupings of the formula
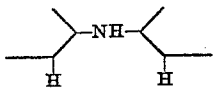
MAURICE GRÉLAT.
WALTER KERN.
References Cited in the file of this patent
UNITED STATES PATENTS
| Number | Name | Date |
|---|---|---|
| 1,690,236 | Mieg | Nov. 6, 1928 |
| 2,364,456 | Lulek | Dec. 5, 1944 |
| 2,385,113 | Smyth | Sept. 18, 1945 |
| 2,420,022 | Tinker | May 6, 1947 |
FOREIGN PATENTS
| Number | Country | Date |
|---|---|---|
| 789,570 | France | May 3, 1935 |